US008334986B2

(12) United States Patent
Moll

(10) Patent No.: US 8,334,986 B2
(45) Date of Patent: Dec. 18, 2012

(54) METHODS AND APPARATUS FOR THE MEASUREMENT OF FILM THICKNESS

(75) Inventor: Johannes Moll, Corning, NY (US)

(73) Assignee: Corning Incorporated, Corning, NY (US)

( * ) Notice: Subject to any disclaimer, the term of this patent is extended or adjusted under 35 U.S.C. 154(b) by 409 days.

(21) Appl. No.: 12/712,854

(22) Filed: Feb. 25, 2010

(65) Prior Publication Data
US 2011/0205540 A1 Aug. 25, 2011

(51) Int. Cl.
G01B 11/06 (2006.01)
(52) U.S. Cl. ......................................... 356/630; 356/601
(58) Field of Classification Search .......... 356/600–601, 356/606–608, 629–630, 634–636, 639–640, 356/503, 504, 484; 250/390.06, 550, 372, 250/341, 559.27
See application file for complete search history.

(56) References Cited

U.S. PATENT DOCUMENTS

| 4,522,510 | A | | 6/1985 | Rosenewaig et al. ............. 374/7 |
| 4,899,055 | A | | 2/1990 | Adams ........................... 250/372 |
| 5,365,340 | A | * | 11/1994 | Ledger ........................... 356/504 |
| 5,523,582 | A | * | 6/1996 | Cheng ....................... 250/559.22 |
| 5,748,317 | A | * | 5/1998 | Maris et al. .................... 356/502 |
| 6,188,478 | B1 | * | 2/2001 | Fuchs et al. .................... 356/630 |
| 6,393,915 | B1 | * | 5/2002 | Banet et al. ...................... 73/579 |
| 6,633,831 | B2 | * | 10/2003 | Nikoonahad et al. ......... 702/155 |
| 6,784,993 | B2 | * | 8/2004 | Opsal et al. .................... 356/369 |
| 6,786,099 | B2 | * | 9/2004 | Janik ............................... 73/655 |
| 6,900,900 | B2 | * | 5/2005 | McMillen et al. ............. 356/504 |
| 6,940,592 | B2 | * | 9/2005 | Borden et al. .................. 356/326 |
| 7,304,744 | B1 | | 12/2007 | Hatanaka et al. .............. 356/477 |
| 7,447,408 | B2 | * | 11/2008 | Bouma et al. .................. 385/123 |
| 7,463,364 | B2 | * | 12/2008 | Yacoubian ..................... 356/502 |
| 7,468,799 | B2 | | 12/2008 | De Groot et al. ............. 356/504 |
| 7,483,147 | B2 | | 1/2009 | Kim et al. ....................... 356/497 |
| 2002/0030826 | A1 | | 3/2002 | Chalmers et al. ............. 356/630 |
| 2003/0038123 | A1 | * | 2/2003 | Dykes et al. ............. 219/121.85 |

FOREIGN PATENT DOCUMENTS

EP 2 124 016 11/2009

* cited by examiner

Primary Examiner — Sang Nguyen
(74) Attorney, Agent, or Firm — Bruce P. Watson; Gibson & Dernier LLP

(57) ABSTRACT

Methods and apparatus for measuring thickness of a thin film include: obtaining a high-speed thickness measurement of a thin film using a laser projection system and detector array, obtaining thickness measurements of the thin film at one or more locations using a single-point measurement apparatus and determining the accuracy of the high-speed measurement values by comparing them to one or more of the absolute thickness values of the film as measured by the single-point measurement apparatus.

24 Claims, 4 Drawing Sheets

METHODS AND APPARATUS FOR THE MEASUREMENT OF FILM THICKNESS

FIELD OF THE INVENTION

The embodiments herein relate to the measurement of film thickness of thin films on glass or other substrates. Methods and apparatus disclosed herein are designed to enable high-speed mapping of film thickness such as would be required for an accurate in-line measurement system for high-volume production of SiOG (Silicon-on-Glass).

BACKGROUND

There are several existing methods for measuring thickness of thin films, including spectroscopic ellipsometry, spectroscopic reflectometry, white light, or low-coherence interferometry, and thermal wave measurement. Each of these methods has limitations.

For example, spectroscopic ellipsometry is a widely-used and highly accurate measurement method for thin film thickness; however, it is a single-point measurement method and typically requires several seconds of measurement time per data point, making it much too slow for high-speed mapping as is required in an in-line system.

Spectroscopic reflectometry is also a widely-used and accurate measurement method for thin film thickness. Like spectroscopic ellipsometry, it is a single-point measurement with typical acquisition times of at least 1 second per data point. This method is not sufficiently fast for high-speed mapping. Commercial systems using spectroscopic reflectometry include those available from OceanOptics, Filmetrics and N&K, to name a few. U.S. Pat. No. 7,304,744 discloses a method employing spectroscopic reflectometry.

The white light, or low-coherence interferometry, technique takes advantage of the same physical phenomenon as spectroscopic reflectometry, but measures reflectance indirectly by means of a white light interferometer instead of a spectrometer. This technique can conceivably enable an imaging mode in which many points are measured simultaneously, but it is a technically difficult and expensive method. U.S. Pat. Nos. 7,468,799 and 7,483,147 relate to methods of measuring thin films using the white light, or low-coherence interferometry, technique.

The thermal wave technique can also be used to measure thermal characteristics of a sample and to draw conclusions on feature thickness such as film thickness. However, this technique is also a single point measurement and requires use of two lasers, one laser to create thermal waves, another to probe the thermal waves, thus it is slow, expensive and may require complicated compensation of thermal lens effects.

None of the aforementioned measurement methods has been adequate to make accurate in-line thickness measurements in the context of high volume SiOG production. Thus, there is a need in the art for new methods and apparatus for high-speed mapping of film thickness such as is required for accurate in-line measurement in high-volume production of SiOG (Silicon-on-Glass).

SUMMARY

Methods disclosed herein employ i) a first measurement of a thin film which is essentially a high-speed full- or partial-width scan measurement that is thickness dependent but does not directly produce a specific value for thickness and ii) a second measurement which is essentially a single-point measurement which is typically more accurate than the first measurement and can be used to calibrate the first high-speed measurement. The first measurement may employ a single light line such as a laser line projected onto a sample and a line detector to measure the reflected intensity of the light. In an embodiment in which a target film thickness for a sample or product exists, light wavelength and angle of incidence may be chosen to optimize correlation with film thickness in a narrow range around the target film thickness. The first measurement may include a reflectance measurement at a single wavelength.

The second measurement is used to verify absolute film thickness in a few spots over time. The second measurement may employ known measurement techniques such as spectroscopic reflectometry or spectroscopic ellipsometry. Using the second measurement one can verify that all data points acquired using the first measurement are within a given thickness range, for example, those in a product specification.

Systems disclosed herein employing the subject methods include apparatus for a first thickness measurement of a thin film and apparatus for a second measurement of the film. Apparatus for the first thickness measurement may include a light source such as a laser and projection optics such as one or more lenses for illumination, collection optics and a detector array such as a line-scan camera for detection. Apparatus for the second measurement may be any suitable single point measurement system such as a spectroscopic reflectometer, ellipsometer or the like. A computing system may process data from the measurement apparatus.

The advantages achieved in the subject methods include simplicity, low cost and higher measurement speeds. In some embodiments systems employing the subject methods may be simple in that a basic system may consist of just a laser and lens for illumination and a detector array such as a line-scan camera for detection (for the first thickness measurement for high-speed, precise mapping), and a simple commercial spectroscopic reflectometer (second, single point measurement for calibration and accuracy (low speed)). These components are relatively inexpensive, and easy to obtain and use. High speeds are achieved in the subject methods because the laser and detector array can measure reflectivity in many points simultaneously, and acquire data many times per second. Using a typical commercial line-scan camera data acquisition rates in the MHz range are achievable. That means, for example, that the film thickness of a typical SiOG part can be measured and mapped in less than 1 second with sub-mm lateral resolution in the thickness map. Measurement time would likely be limited only by the line speed of the sample passing through the measurement system. Conversely, traditional single point methods, such as spectroscopic reflectometry, require several minutes or even hours to achieve the same level of measurement.

With an accuracy of just 2.5% in the reflectance measurement, film thickness using the presently disclosed systems and methods can be measured with an accuracy of about 1 nm, which is well within the typical requirements of such a system. The presently disclosed methods are particularly well-suited for thinner films as the thickness dependence of the reflectance decreases for thicker films.

Other aspects, features, advantages, etc. will become apparent to one skilled in the art when the description herein is taken in conjunction with the accompanying drawings.

BRIEF DESCRIPTION OF THE DRAWINGS

For the purposes of illustrating the various features disclosed herein, there are shown in the drawings forms that are presently preferred, it being understood, however, that the invention is not limited to the precise arrangements and instrumentalities shown.

DETAILED DESCRIPTION

In general a method of measuring the thickness of a thin film is provided which employs two measurements: a first, high-speed scanning measurement of the thin film and a second, single-point calibration measurement of the film.

The first measurement may employ a single light line such as a laser line projected onto a sample and a line detector to measure the reflected intensity of the light. The measured reflected light intensity of a sample is a function of the composition and thickness of the film and substrate material as well as illumination intensity. The data for refractive index and absorption coefficients of the film and substrate may be obtained from tables available in the literature as is well known to those skilled in the art. Similarly, refractive index and absorption of the chosen light wavelength can be looked up in the literature for the film and substrate materials. Therefore, at least in an embodiment in which a target film thickness for a sample or product exists, light wavelength, angle of incidence, and polarization state may be chosen to optimize correlation with film thickness in a narrow range around the target film thickness. The first measurement may include a reflectance measurement at a single wavelength.

Figure 1:
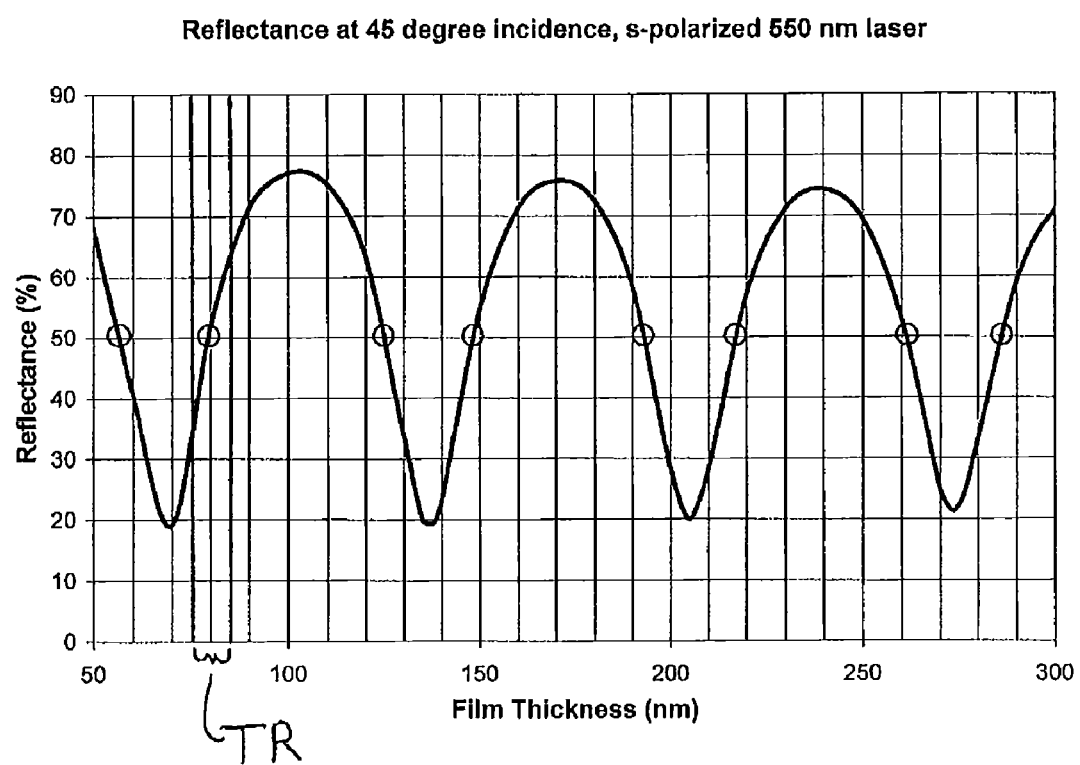
FIG. 1 is a graphical representation of an exemplary reflectance calculation (crystalline Si on Eagle™ (Corning®) substrate) for a s-polarized 550 nm laser at 45 degree incidence, including a tolerance range (TR) between 75 and 85 nm in accordance with one or more embodiments disclosed herein.

For example, now referring to FIG. 1, a reflectance calculation for a first measurement of a sample of crystalline Si on an Eagle™ (Corning®) substrate for an s-polarized 550 nm laser at 45 degree incidence was performed using TFCalc software and literature data for refractive index and absorption coefficients of the film and substrate. The circles, corresponding to 56, 79, 125, 148, 193 and 217 nm, illustrate that a reflectance measurement alone, while very fast, on the order of a few milliseconds, is ambiguous in that several different film thicknesses can result in the same reflectance. As shown, for a 50% reflectance the thickness could be ~56, 79, 125, 148, 193, 217, . . . nm. Because the measured reflected light intensity of a sample is not only a function of the composition and thickness of the film and substrate material, but also of illumination intensity, the first measurement requires calibration.

Thus, as described herein the first measurement is calibrated by obtaining a second, single point thickness measurement, such as by a reflector of known reflectivity at a chosen laser wavelength, polarization, and angle of incidence. In essence, the second measurement entails illuminating a chosen single point of the subject film with white light, performing a full spectrum analysis of the reflected light and fitting theoretical models to the measured full spectrum reflectance data using various fit parameters such as refractive index, absorption, and thickness of the film and substrate. The calibration or reference measurement is also used to compensate for variations in light intensity over time and along the light line, i.e., different positions of the line of light created by a lens, rotating scanner or the like of a light projection system. This is achieved by determining the thickness at a certain location using the second measurement, then calculating the expected reflectivity using the apparatus of the first measurement, and comparing it to the actually measured reflected light intensity of the first measurement. The actual reading of the second measurement is relatively fast, i.e., a few milliseconds. Completion of the second measurement takes a little longer, however, about one or two seconds, due to the processing time to perform the full spectrum calculation and fitting the results using theoretical models. Thus, one or more second, single-point calibration measurements are performed to provide one or more reference measurements to provide accurate thickness measurements. As will be apparent to the skilled artisan, the first high-speed thickness measurement and the second, single-point calibrating measurement do not have to be performed at the same point in time.

If the measured value(s) of the film thickness obtained by the single-point second measurement is within a specified thickness range, and all values obtained from the first, high-speed thickness measurement are within the expected percentage range, the thickness of the film as calculated from the high-speed measurement is unambiguous. It is sufficient to obtain the absolute thickness value using the single-point measurement in only a few locations, therefore the measurement speed is not limited by its acquisition rate. The continuity of the film ensures that if all points within a map are in the expected reflectance range, and thickness is in the correct range in at least one point as measured by the single-point measurement, then all points in the map must be within the expected thickness range. If some of the points are outside the expected thickness range, some of the points would necessarily have to be outside the acceptable percentage range for reflectance unless there are large sudden step changes in thickness.

For example, in the example shown in FIG. 1, if one wanted to measure a film and ascertain that the entire film is in the tolerance range TR between 75 and 85 nm thickness (i.e., ~30-65% reflectance), and a single point measurement was performed indicating a thickness in the 75 to 85 nm range, all one would need to do is to confirm that all reflectance values measured in the film are between 30 and 65%. If any area of the film were to fall outside the acceptable 75-85 nm range, and there are no large step changes in film thickness, some of the measured reflectance as obtained by the high-speed measurement would have to be either less than 30% or larger than 65%.

It will be recognized by those skilled in the art the presently disclosed methods may not achieve the accuracy of some other measurement techniques because reflectance is not only a function of film and substrate material and thickness, but also of substrate positioning (vertical to the sample surface), film and surface scattering, and other factors. However, the presently disclosed methods are more than adequate for the typical requirements of such systems. Now referring to FIG. 2, an example is shown of a reflectance calculation for a crystalline Si film on a glass substrate (Eagle™ substrate available from Corning®) for different laser wavelengths at 45 degree incidence using s-polarization. The calculations were performed using TFCalc software and literature data for refractive index and absorption coefficients of the film and substrate. In this example, it can be seen for this particular case a wavelength near the common 632.8 nm HeNe laser wavelength was not very useful because the relationship between reflectance and film thickness is not monotonic (see 630 nm curve); however, the HeNe wavelength may be useful at a different angle of incidence θi or for a different thickness range. The optimum combination of wavelength, angle of incidence, polarization state, and availability of lasers has to be determined for each case depending on film and substrate materials and film thickness range.

Figure 3:
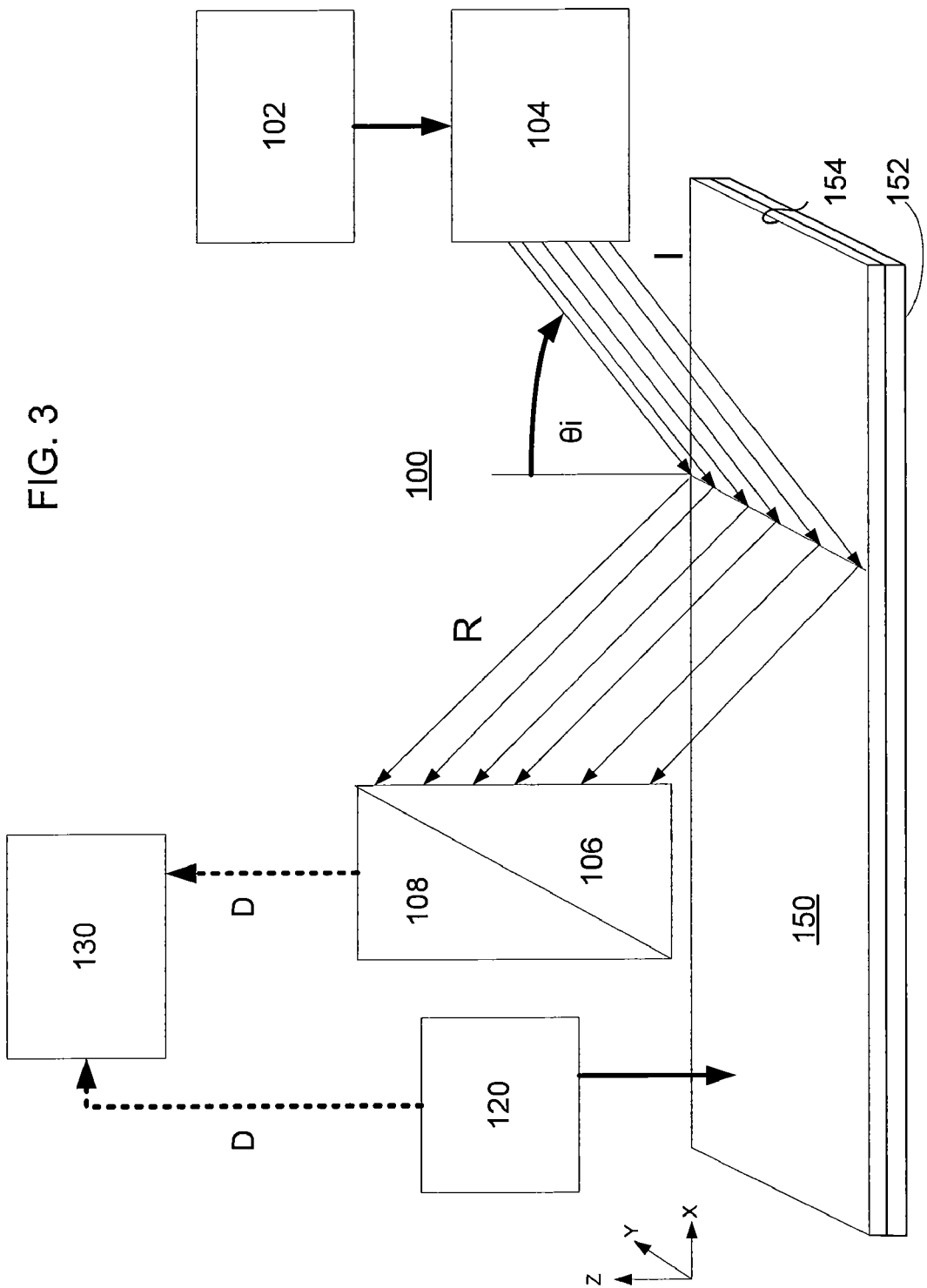
FIG. 3 is a diagrammatic representation of a system in accordance with one or more embodiments disclosed herein.

With further reference to the drawings, wherein like numerals indicate like elements, there is shown in FIG. 3 an embodiment of a measuring apparatus 100 for measuring the thickness of a film 154 such as may be disposed on a substrate 152 in a given sample 150. Film 154 may be silicon or another semiconductor material. Substrate 152 may be a glass or glass-ceramic material, or any other suitable substrate material.

The apparatus 100 includes at least one light source 102, projection optics 104, collection optics 106, detector array 108, a single point measurement apparatus 120 and a computing system 130. The light source 102 and projection optics 104 are positioned to illuminate the surface of the film 154, wherein the collection optics 106 and detector array 108 operate to produce a thickness measurement in response to the illumination intensity produced proximate to the surface of the film 154. The single point measurement apparatus 120 is positioned to obtain accurate measurements of film 154 thickness at one or more points. The computing system 130 operates to analyze the measurement obtained from the detector array 108, compare the measurement to the measurements obtained from the single point measurement apparatus 120, and calibrate the thickness measurement of the film 154.

Before discussing further details of the apparatus 100, a discussion will first be provided as to an exemplary context within which the sample 150 may be found and certain processing that may be carried out thereon. For purposes of discussion, the methods and apparatus described herein may be in the context of the development and/or manufacture of SOI structures. The SOI structures have suitable uses in connection with fabricating thin film transistors (TFTs), e.g., for display applications, including organic light-emitting diode (OLED) displays and liquid crystal displays (LCDs), integrated circuits, photovoltaic devices, etc. To date, the semiconductor material most commonly used in SOI structures has been silicon. Such structures have been referred to in the literature as silicon-on-insulator structures and the abbreviation "SOI" has been applied to such structures. SOI technology is becoming increasingly important for high performance thin film transistors, solar cells, and displays, such as active matrix displays. SOI structures may include a thin layer of substantially single crystal silicon on an insulating material.

The references to SOI structures herein are made to facilitate the explanation of the embodiments described herein and are not intended to, and should not be interpreted as, limiting the claims in any way. The SOI abbreviation is used herein to refer to semiconductor-on-insulator structures in general, including, but not limited to, semiconductor-on-glass (SOG) structures, silicon-on-insulator (SOI) structures, and silicon-on-glass (SiOG) structures, which also encompasses silicon-on-glass-ceramic structures. Moreover, as will be apparent to the skilled artisan, the presently disclosed methods are not limited to semiconductor or SOI structures, and may employed in connection with any material that is transparent at the light wavelength used for the measurements.

With reference to FIG. 3, a thin film 154 of semiconductor material may be used in the production of, or development of, an SOI device. In the context of the embodiments discussed herein, the thin film of semiconductor material 154 and substrate 152 (e.g., a glass or glass-ceramic material) may be the sample 150 structure subjected to measurement. Again, however, the film 154 being semiconductor and the substrate 152 being glass or glass ceramic are only exemplary, and the apparatus 100 and/or other methods and apparatus described herein may operate on semiconductor-on-semiconductor SOI and other non-semiconductor materials.

A semiconductor film 154 may have been prepared, such as by polishing, cleaning, etc. to produce a relatively flat and uniform surface. For the purposes of discussion, the semiconductor film 154 may be a substantially single crystal Si film, although any other suitable semiconductor conductor material may be employed, such as the III-V, II-IV, II-IV-V, etc. classes of semiconductors. Examples of these materials include: silicon (Si), germanium-doped silicon (SiGe), silicon carbide (SiC), germanium (Ge), gallium arsenide (GaAs), gallium nitride (GaN), gallium phosphide (GaP), and indium phosphide (InP). The semiconductor film 154 may have been disposed on the substrate 152 by any known process such as exfoliation or deposition.

With reference to FIG. 3, light source 102 may be a laser, chosen for its narrow spectrum and high intensity, but as will be apparent to the skilled artisan, other light sources (such as LEDs) may work as well if they have a narrow emission spectrum and sufficient intensity.

Projection optics 104 may include a cylindrical lens, rotating scanner, rotating mirror, reflector and the like as further detailed below with respect to FIG. 4. The function of the projection optics 104 is to project a line of light onto the surface of the film 154 of the sample 150 with the required intensity and polarization state. The projection optics 104 may be arranged to collimate the light incident I on the sample 150 such that vertical displacement of the sample 150 (in z) would not change where the light hits the sample in the y-direction (although it would still affect x-position). Projection optics 104 may also be implemented with diverging or converging light. The light wavelength, polarization state, and angle of incidence θi are chosen to provide the best sensitivity for a given film thickness range. For example, if the film thickness is expected to be in the range between 70 and 90 nm, a laser operating at 550 nm wavelength can be used in s-polarization at 45 degree incidence θi to obtain a reflectance R ranging from <20% at 70 nm to >70% at 90 nm film thickness.

To achieve the required lateral resolution in the direction X one can either project a line narrow enough to meet the requirement (line width<=required X-resolution), or the collection optics 106 can be arranged such that only light from a narrow width (in direction X) is imaged onto the detector array 108.

Collection optics 106 may include a cylindrical lens, rotating scanner, rotating mirror, reflector and the like. The purpose of the collection optics 106 is to receive the reflected light R and image the light as desired onto the detector array 108.

Detector array 108 is any suitable detector array such as a line-scan camera. The detector array 108 measures the intensity of the reflected light R, therefore it must be sensitive at the chosen laser wavelength. The choice of detector array may depend on the wavelength of the light, the required resolution, and processing speed. An example of a suitable detector array is a line scan camera commercially available from Basler or Dalsa.

It is also possible to project light onto a much wider area (in direction X) on the sample 150, using a 2 dimensional (area) detector array, which could result in less sensitivity to sample movement (in direction Z). A wider line on the sample (in direction X) with a linear detection array 108 is believed to reduce sensitivity to vertical movement of the sample (in Z).

Figure 4:
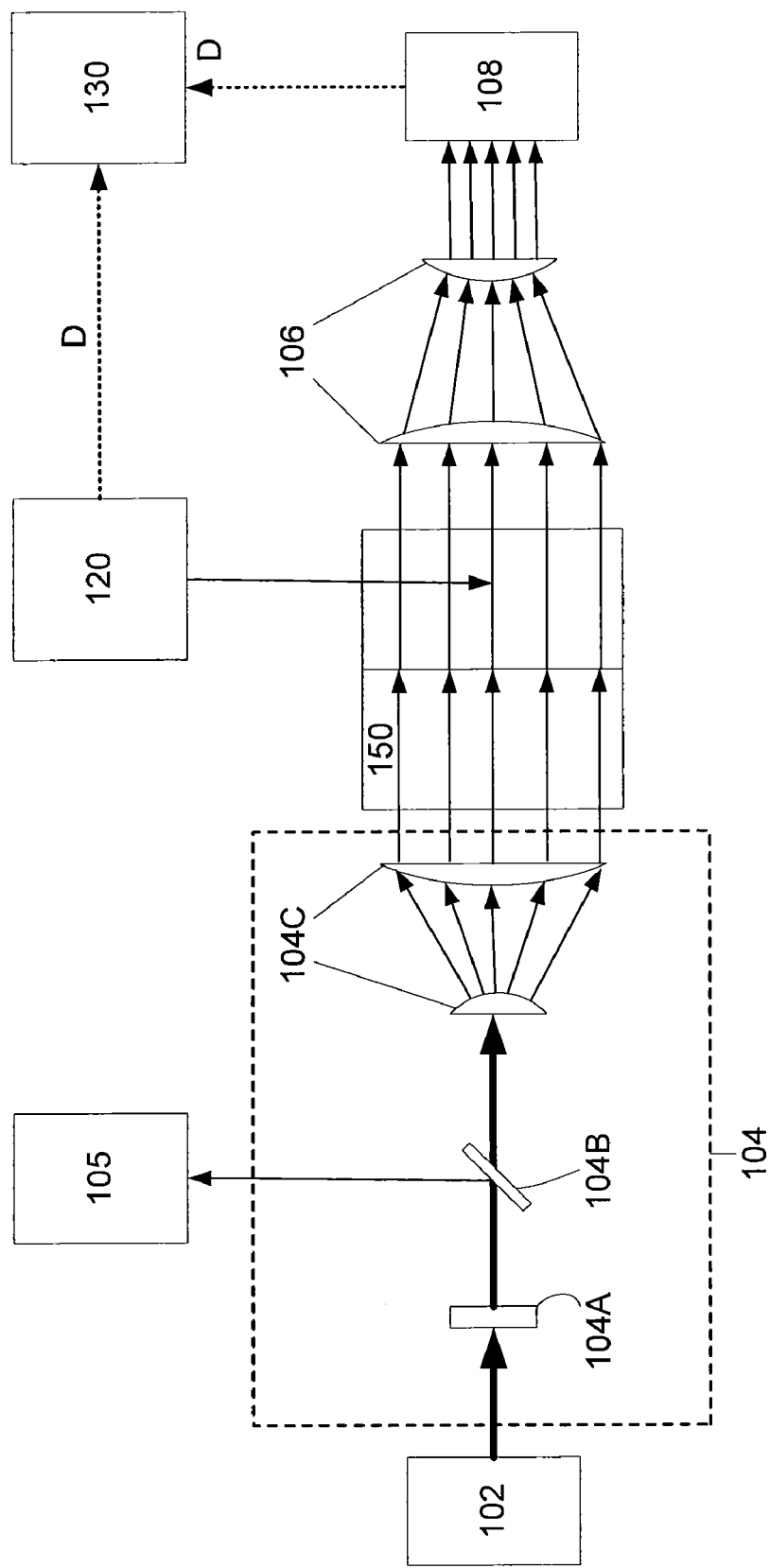
FIG. 4 is a diagrammatic representation of a system in accordance with one or more embodiments disclosed herein.

Now referring to FIG. 4, in another embodiment a system 100 is depicted wherein projection optics 104 may include a polarizer 104A, beam splitter 104B and cylindrical lenses 104C. A polarizer 104A might be required where the light source 102 is not a laser light source. A power meter 105 may be included for light intensity correction and control. In an alternate embodiment, instead of the first cylindrical lens 104C after beam splitter, a rotating mirror may be used to create the light line on the sample 150 (flying point). An advantage of such an arrangement would be higher intensity of the light on the sample 150 and reduced power requirements for the light source 102. Some loss of speed in measurement might result from such an arrangement because only one point could be measured at a time. As will be apparent to those having skill in the art, any of the lenses 104C could be replaced by a curved reflector.

For mapping, either the sample 150 moves along the X direction with the optical system (projection optics 104, collection optics 106 and detector array 108) remaining fixed, or the entire optical system moves in the X direction relative to a fixed sample 150, or a combination of both. In an embodiment wherein the optical system is fixed and the sample 150 is traveling on a conveyor or motion system, moving through the measurement system 100 at a known speed, such speed can be used to establish coordinates for the measured data points.

In order to ensure proper thickness measurements are obtained, the reflectance value obtained by the first measurement must be determined to be accurate. This requires that the intensity of the light source 102 used for the first measurement is either controlled or monitored. Such control may be achieved in a number of ways. In one embodiment, such control may be achieved by splitting off a small part of the light to a separate detector (not shown) and including a feedback loop to keep intensity constant over time. This technique is routinely employed in many light sources. In another embodiment, part of the incident light may be split off, measured using power meter 105 and compared to the measured reflected light using an optical beam splitter 104B and an accurate measurement of reflectance is possible if the reflectance of the beam splitter is known. In another embodiment, measured reflectance at a particular point in the film can be compared to the theoretical reflectance calculated from the second, single point thickness measurement at the same point in the film, and a correction factor applied for the measured reflectances based on that comparison.

The second, single-point thickness measurement apparatus 120 is employed to provide accurate thickness measurements to calibrate the first high speed measurement, and to ensure the film 154 is in the correct thickness range. The single point thickness measurement apparatus 120 may be a spectroscopic reflectometer, ellipsometer, low-coherence interferometer or another suitable thickness measurement tool known to those skilled in the art. The single-point thickness measurement is performed at a location on the film 154 that is also measured by the first measurement apparatus, but the respective measurements do not have to be performed at the same point in time. Therefore the single-point thickness measurement apparatus 120 can be offset from the light source 102 and projection and collection optics 104 and 106 with respect to a sample 150 in motion.

Figure 2:
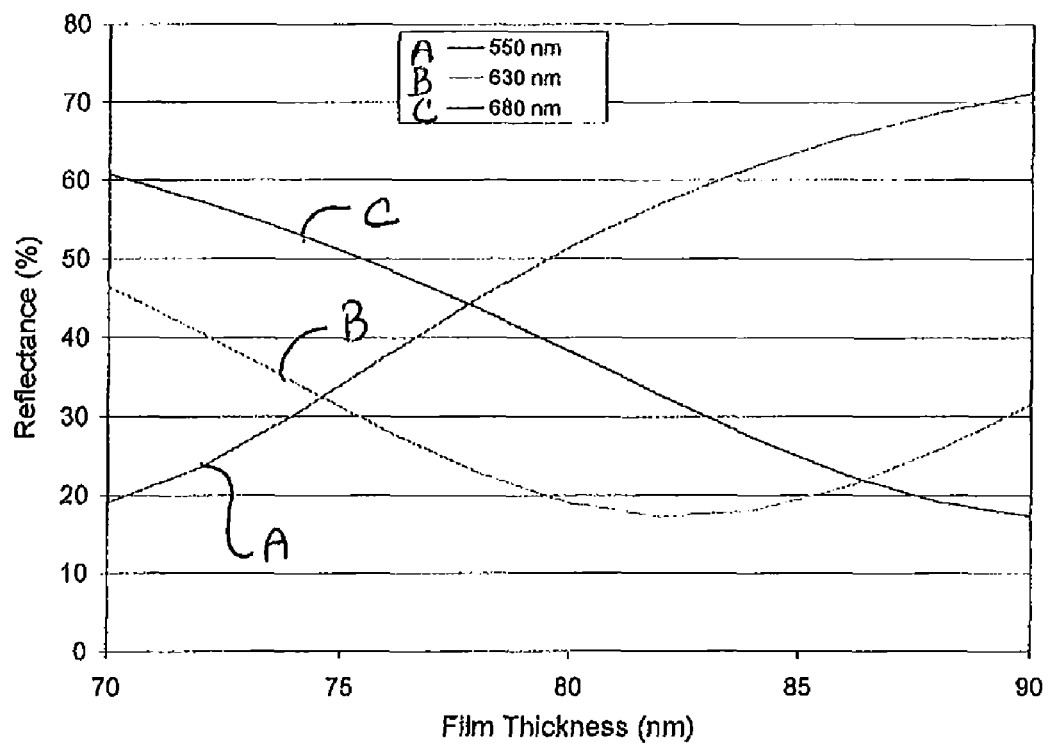
FIG. 2 is a graphical representation of an exemplary reflectance calculation (crystalline Si on Eagle substrate) for different laser wavelengths at 45 degree incidence and using s-polarization in accordance with one or more embodiments disclosed herein.

Computing system 130 processes the data D from the detector array 108 and converts them into thickness values using the calibration data D obtained from the single point measurement apparatus 120. The computing system 130 which includes a processor capable of running computer executable code takes the reflectance data D and calculates thickness based on curves such as shown in FIG. 2 in conjunction with previous calibrations and simultaneous absolute thickness measurements from the single point measurement apparatus 120. Based on this information the computing system may create thickness maps at high resolution and identify any areas that are outside a specified thickness range. If needed, the data can be saved for further processing, or used by other processing equipment. The computed result may be provided to a user of the apparatus 100 by way of a display means within the computing system 130, such as a computer screen, a print-out, etc. The hardware of the computing system 130 may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc.

Although the embodiments herein have been described with reference to particular features, it is to be understood that these embodiments are merely illustrative of the principles and applications thereof. It is therefore to be understood that numerous modifications may be made to the illustrative embodiments and that other arrangements may be devised without departing from the scope of the appended claims.

The invention claimed is:

1. An apparatus for measuring the thickness of a thin film on a surface, comprising:
    a first measurement apparatus operating to obtain a first thickness measurement value based on illumination intensity of an elongate light beam having an elongate line-shaped cross section scanned across and reflected from the surface of the thin film;
    a second measurement apparatus comprising a single point measurement device operating to obtain one or more further thickness measurement values of the thin film based on illumination intensity of one or more single points of light reflected from the thin film; and
    a computing system operating to calibrate the first thickness measurement value using the one or more further thickness measurement values of the thin film.

2. The apparatus of claim 1, wherein the first measurement apparatus comprises a light source and projection optics operating to produce the elongate light beam on the surface of the thin film, collection optics operating to receive light reflected from the surface of the thin film, and a detector array operating to measure the intensity of light reflected front the thin film.

3. The apparatus of claim 2, the light source comprising a laser.

4. The apparatus of claim 3, the projection optics including one or more of a cylindrical lens, rotating scanner, polarizer, beam splitter and/or reflector.

5. The apparatus of claim 2, the detector array comprising a line-scan camera.

6. The apparatus of claim 1, wherein the second measurement apparatus is selected from the group consisting of a spectroscopic reflectometer, spectroscopic ellipsometer, and low-coherence interferometer.

7. The apparatus of claim 1, wherein the second measurement apparatus is a spectroscopic reflectometer.

8. The apparatus of claim 1, wherein the computing system operates to process data from a detector array and convert them into thickness values using calibration data obtained from the single point measurement apparatus.

9. The apparatus of claim 8 wherein the computing system operates to calculate thickness of the thin film using data from previous calibrations and/or simultaneous absolute thickness measurements from the single point measurement apparatus.

10. The apparatus of claim 1, wherein the apparatus operates to measure the thickness of a thin film disposed on a surface of a substrate.

11. The apparatus of claim 1, wherein the apparatus operates to measure the thickness of a thin semiconductor film disposed on a glass or ceramic substrate.

12. The apparatus of claim 1 wherein the thin film is part of a sample, the sample comprising a semiconductor-on-insulator structure selected from the group consisting of semiconductor-on-glass (SOG) structures, silicon-on-insulator (SOL) structures, and silicon-on-glass (SiOG) structures.

13. A method of measuring the thickness of a thin film on a substrate comprising:
    scanning an elongate light beam having an elongate lineshape cross section across a surface of a thin film on a surface;
    sensing the illumination intensity of a reflection of the elongate light beam from the thin film;
    calculating a first thickness measurement based on the illumination intensity of the elongate light beam by a computer system;
    projecting one or more single-points of light on the thin film; sensing the illumination intensity of a reflection of the one or more single-points of light;
    calculating a one or more further thickness measurements based on the illumination intensity of the reflection of the one or more single-points of light by the computer system; and
    calibrating the first thickness measurement using the one or more further thickness measurements.

14. The method in accordance with claim 13 wherein, the one or more further thickness measurements is selected from the group consisting of spectroscopic reflectometry, spectroscopic ellipsometry and low-coherence interferometry.

15. The method in accordance with claim 13 wherein the one or more further thickness measurements is spectroscopic reflectometry.

16. The method in accordance with claim 13 comprising obtaining the first thickness measurement and the one or more further thickness measurements in the same region of the thin film at different points in time.

17. The method in accordance with claim 13 comprising:
    processing illumination data received from a detector array; and
    converting the data into thickness values using data obtained from the single point measurement method.

18. The method in accordance with claim 17 wherein the processing step comprises calculating thickness of the thin film using data from previous calibrations and/or one or more simultaneous absolute thickness measurements from the single point measurement method.

19. The method in accordance with claim 13 comprising:
    obtaining a target film thickness; and
    selecting light wavelength and angle of incidence to optimize a correlation with film thickness in a range around the target film thickness.

20. The method in accordance with claim 13 wherein the step of obtaining a first thickness measurement based on illumination intensity of a of reflection of the elongate light beam includes a reflectance measurement at a single wavelength.

21. The method in accordance with claim 13 wherein the step of obtaining one or more further thickness measurement includes illuminating at least one point of the thin film with white light and performing a spectral analysis of the reflected light using one or more fit parameters selected from refractive index, absorption, film thickness and substrate thickness.

22. An apparatus for measuring the thickness of a thin film on a surface, comprising:
    a first measurement apparatus operating to obtain a first thickness measurement value based on illumination intensity of an elongate light beam having an elongate line-shaped cross section scanned across and reflected from the surface of the thin film;
    a second measurement apparatus comprising a single point measurement device operating to obtain one or more further thickness measurement values of the thin film based on illumination intensity of one or more single points of light reflected from the thin film; and
    a computing system operating to calibrate the first thickness measurement value using the one or more further thickness measurement values of the thin film, and create one or more thickness maps of the thin film and optionally identify any areas of the thin film that are outside a specified thickness range.

23. The apparatus of claim 22, wherein the computing system operates to process data from a detector array and convert them into thickness values using calibration data obtained from the single point measurement apparatus.

24. The apparatus of claim 22 wherein the computing system operates to calculate thickness of the thin film using data from previous calibrations and/or simultaneous absolute thickness measurements from the single point measurement apparatus.

* * * * *